Nov. 28, 1933.    R. B. HITCHCOCK    1,936,760
CORN PICKER
Filed April 12, 1933    9 Sheets-Sheet 5
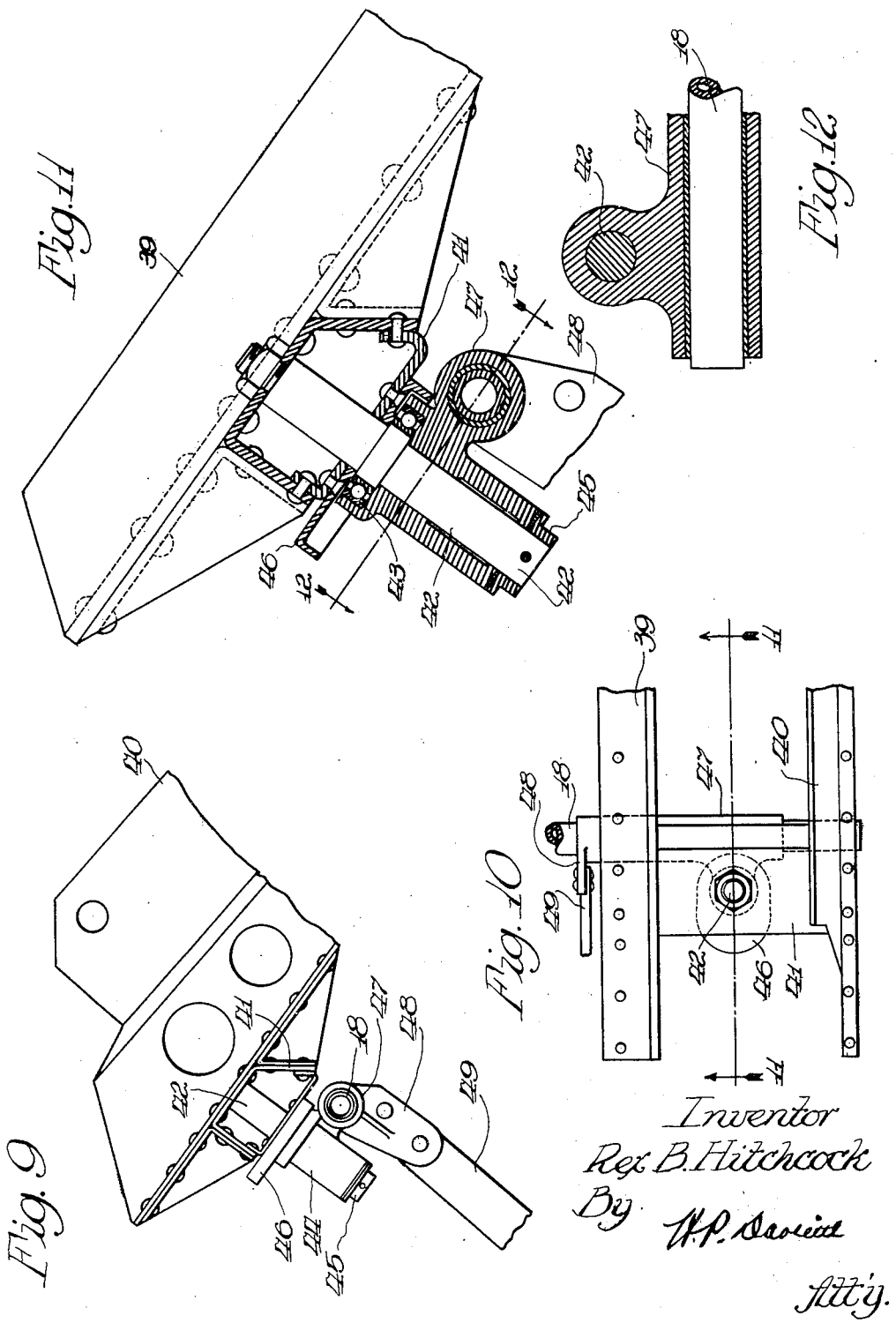

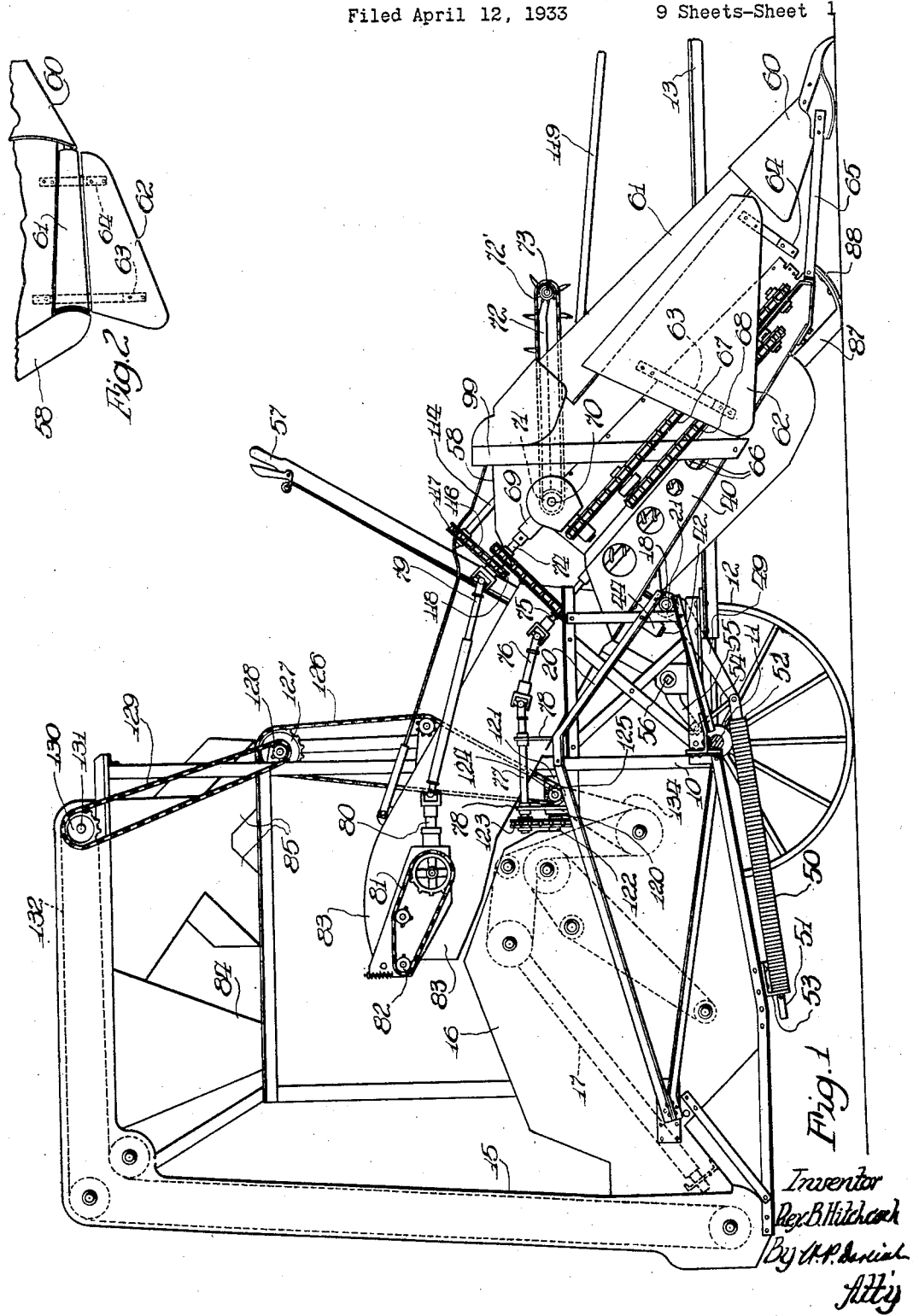

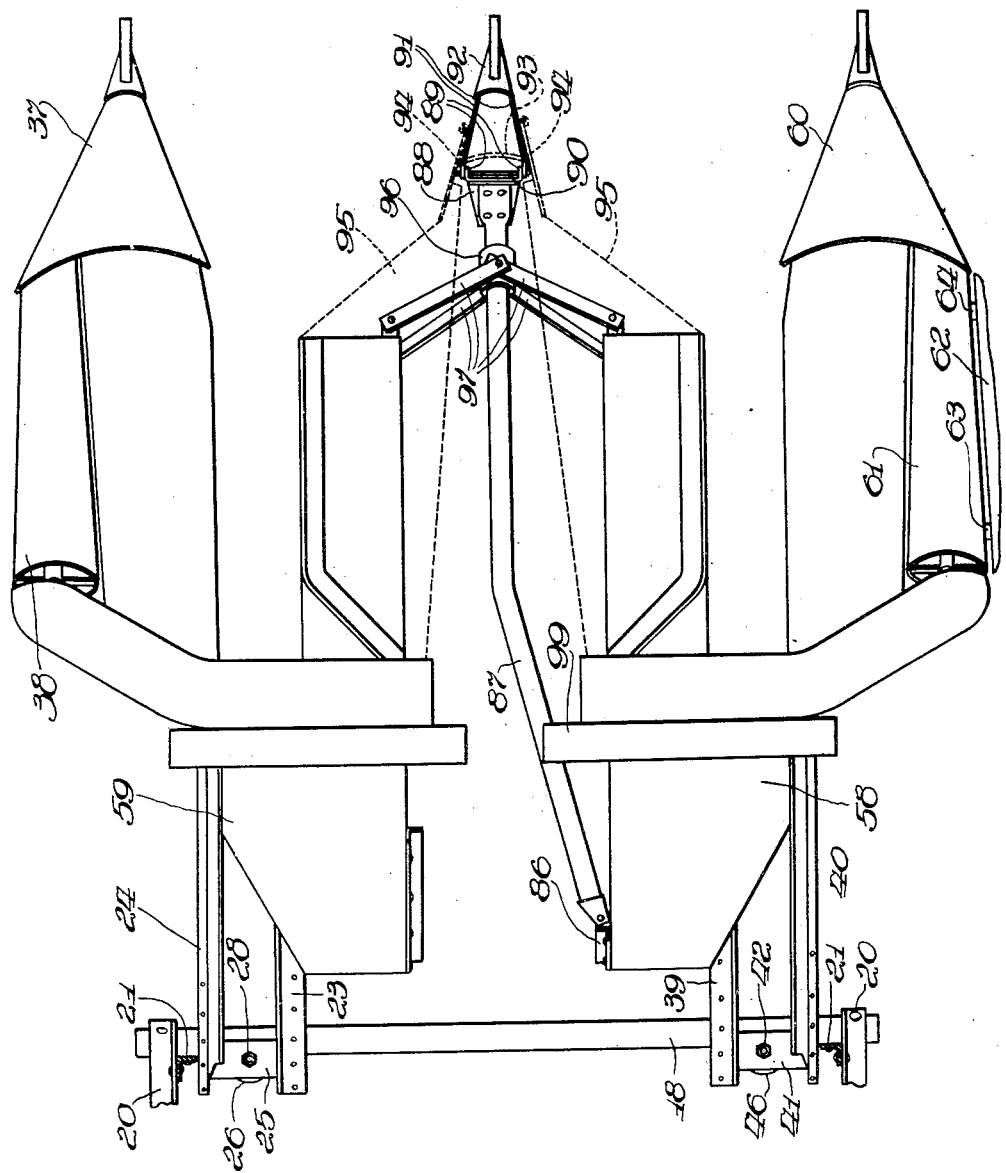

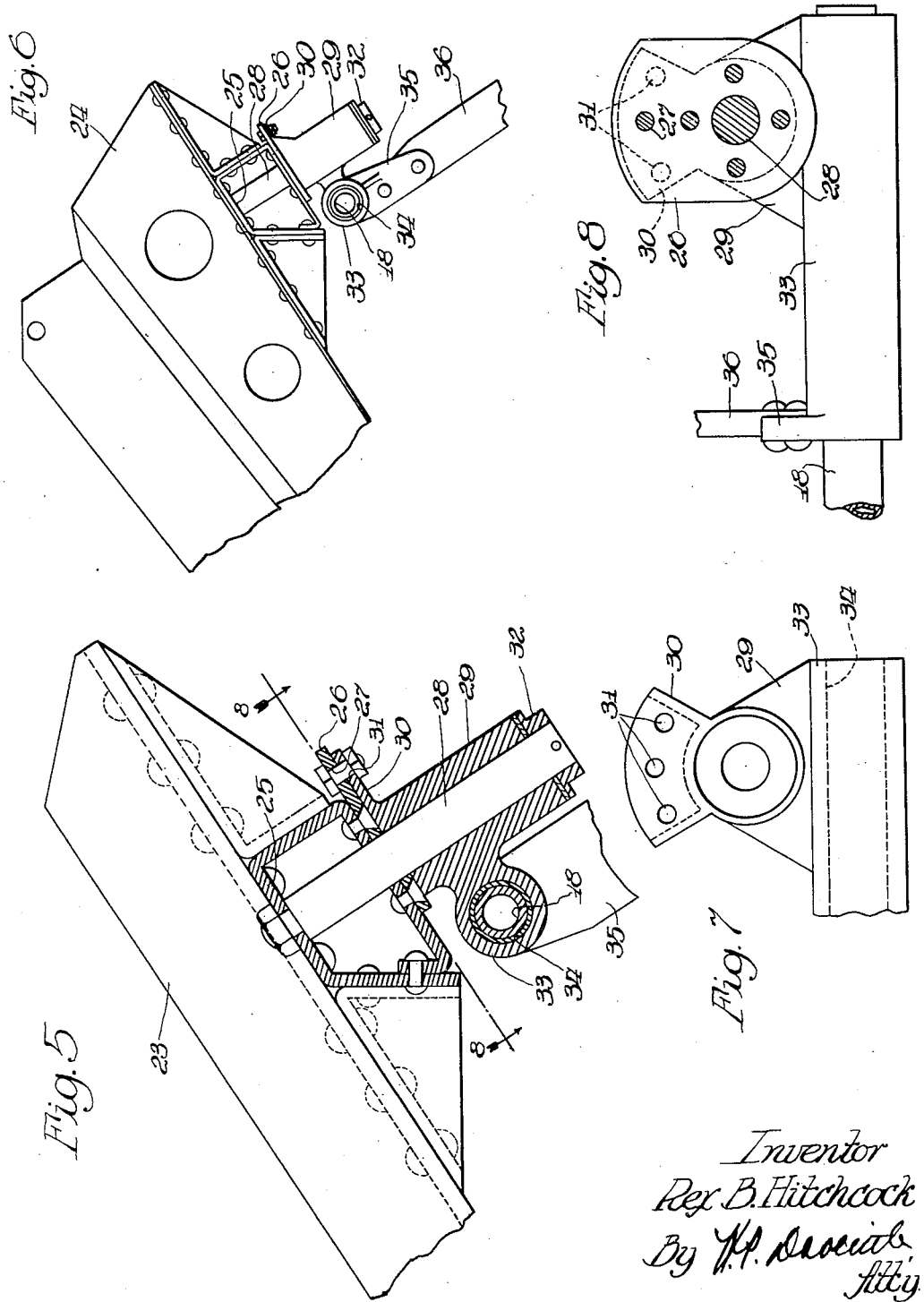

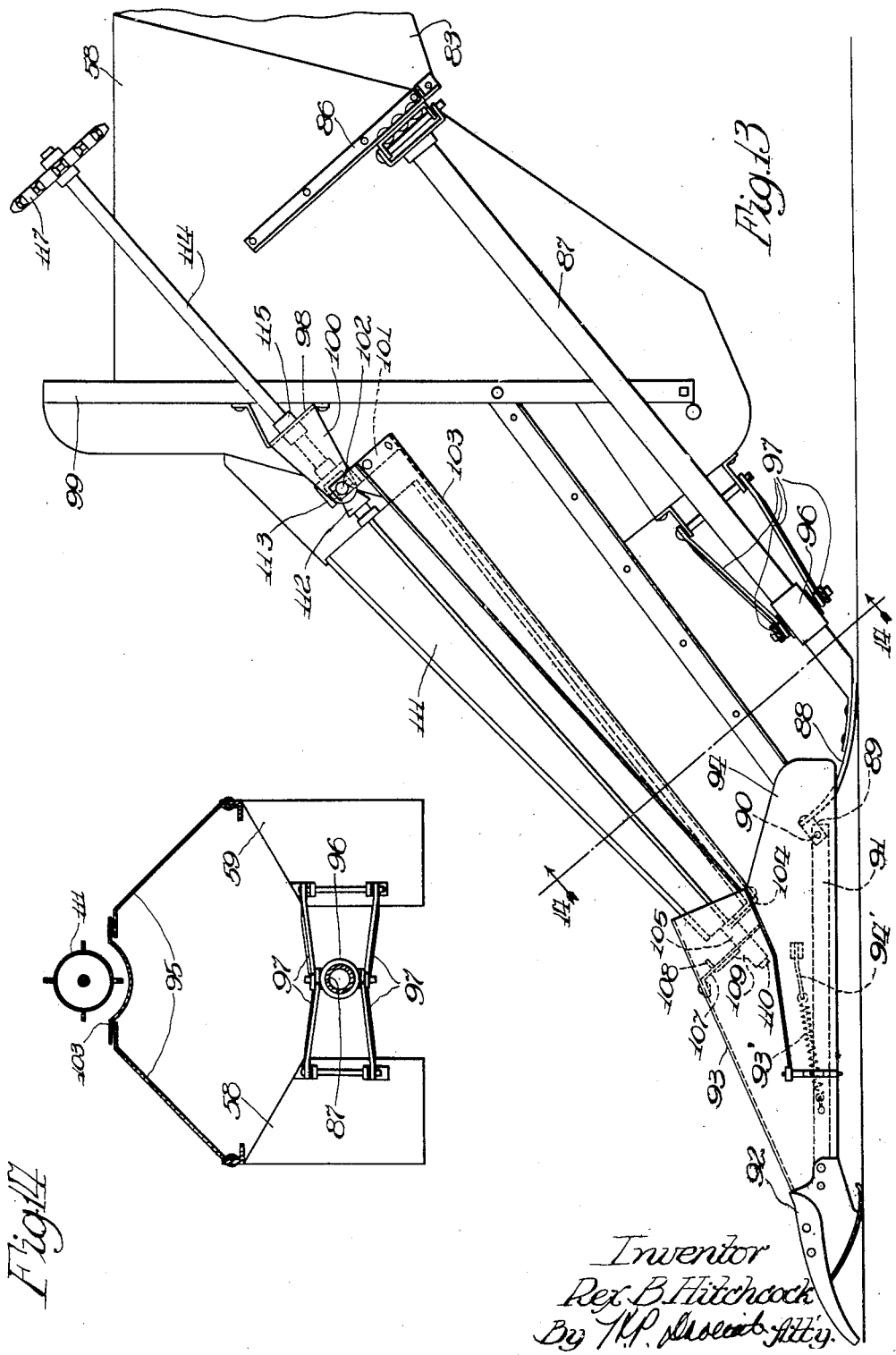

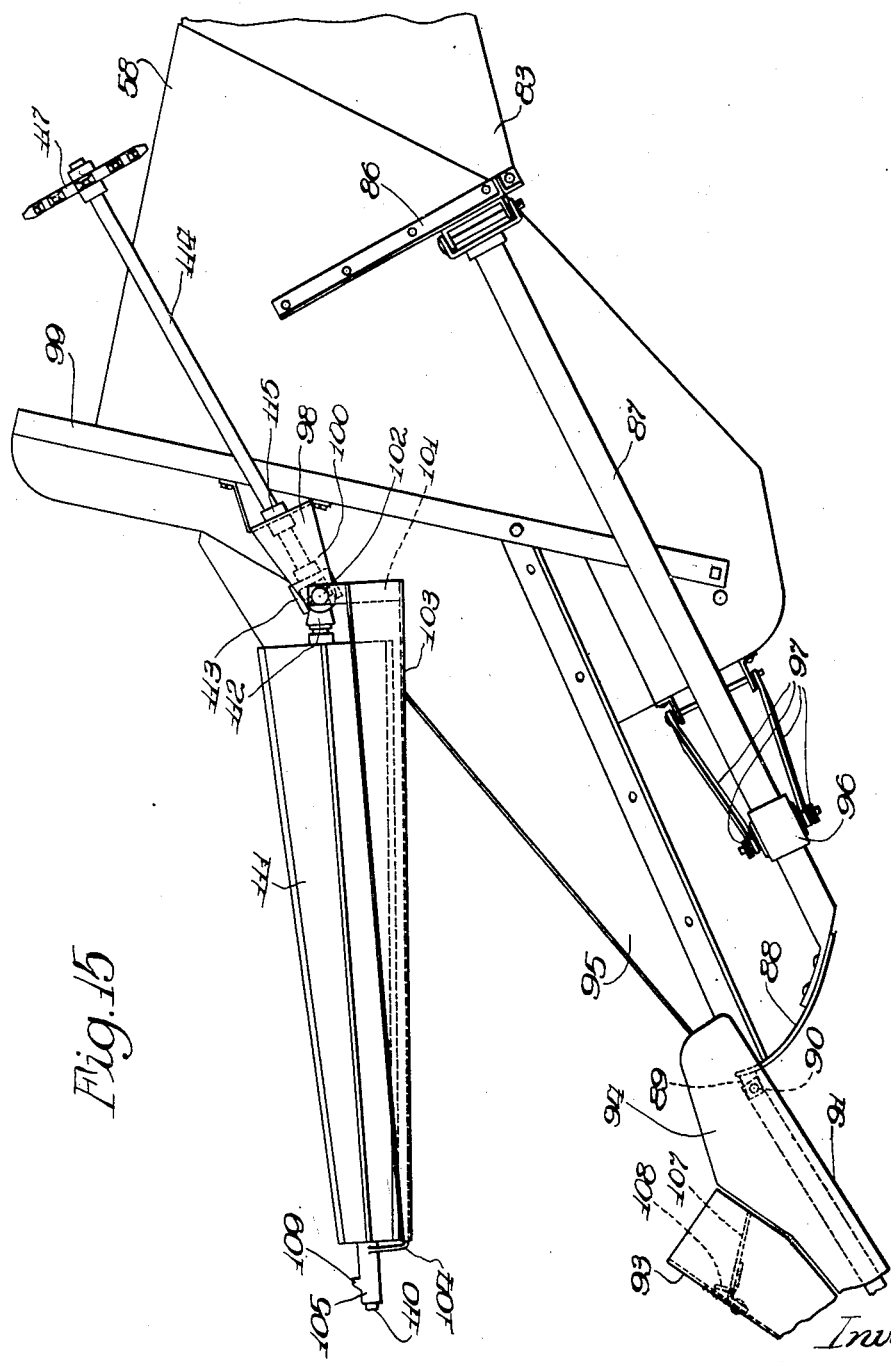

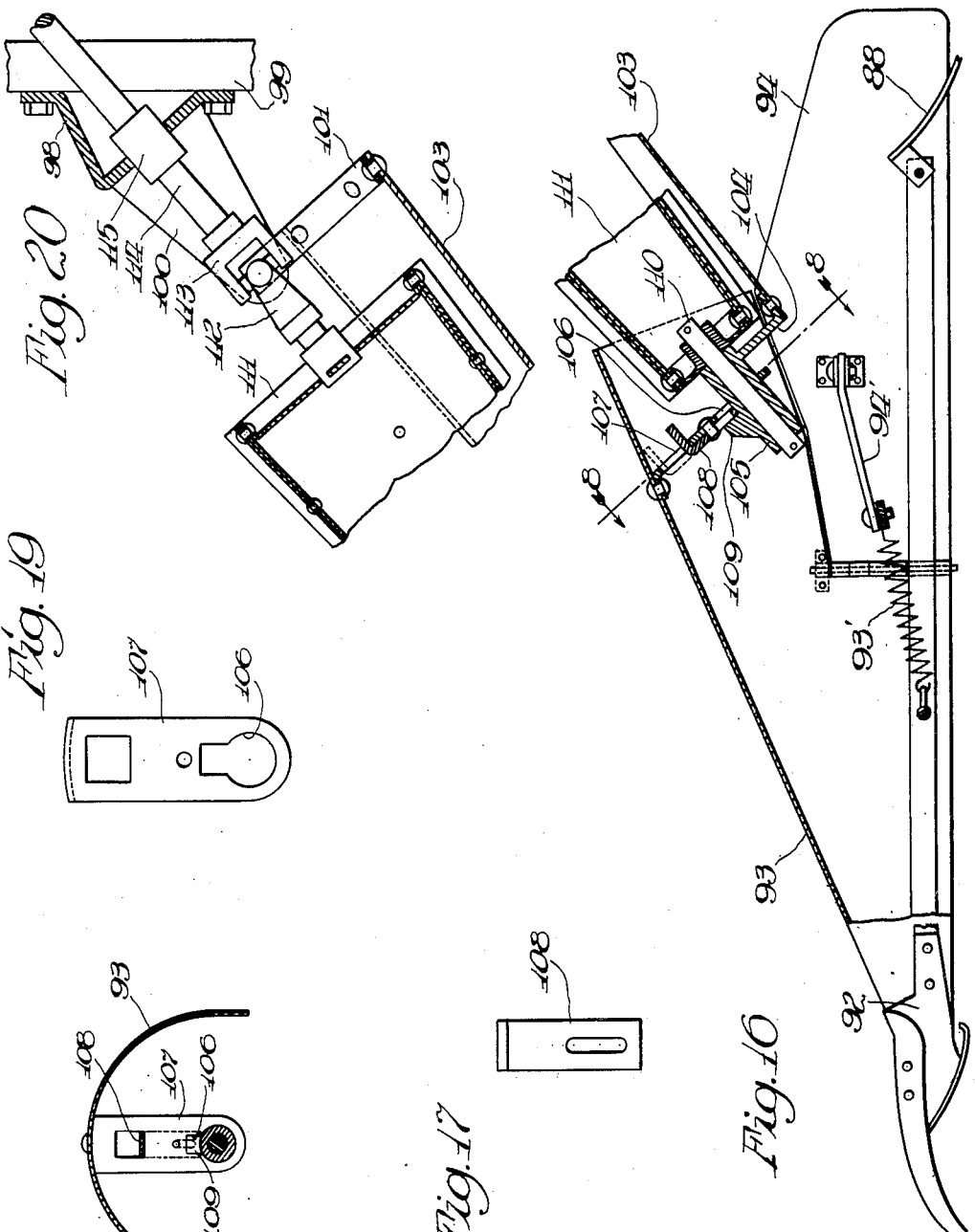

Nov. 28, 1933.  R. B. HITCHCOCK  1,936,760
CORN PICKER
Filed April 12, 1933  9 Sheets-Sheet 9
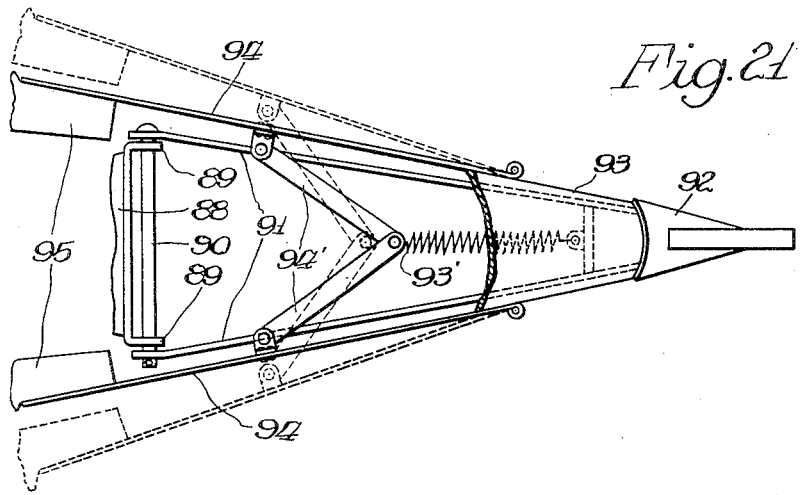
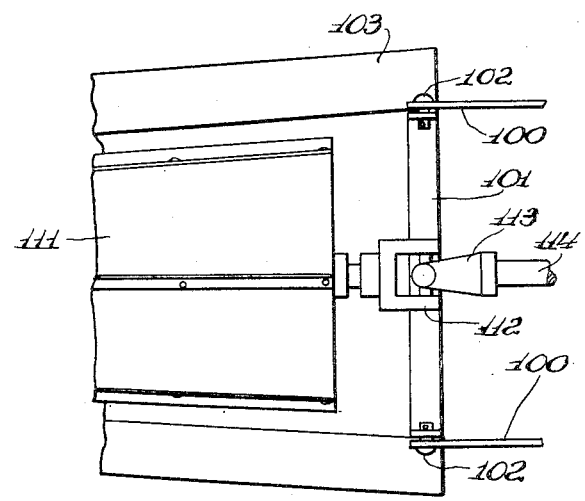
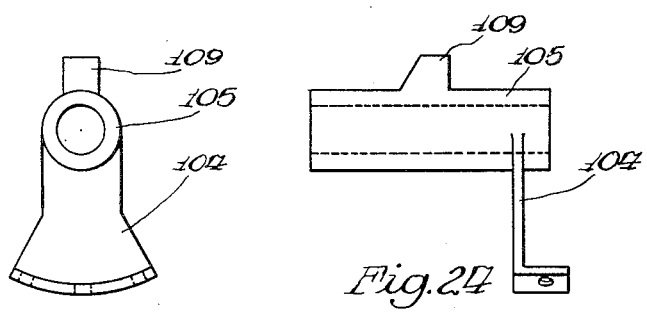
Inventor
Rex B. Hitchcock
By
Atty.

Patented Nov. 28, 1933

1,936,760

UNITED STATES PATENT OFFICE 1,936,760

CORN PICKER

Rex B. Hitchcock, Croix-Wasquehal, France, assignor to International Harvester Company, a corporation of New Jersey Application April 12, 1933. Serial No. 665,631

11 Claims. (Cl. 56—18)

This invention relates to a corn picker. More particularly it relates to a two-row corn picker in which the units for operating on the two rows are laterally adjustable, and to features which improve the ability of the picker to handle broken stalks and other trash.

In the construction and operation of multiple row pickers it has been found that difficulty is experienced in maintaining the picking units in proper relation with respect to the rows being operated upon. This is particularly true where the rows vary in width as is often the case where the planting is not accurately done. It is also desirable to construct a picker so that it may be adjusted for operation upon rows of different widths. A principal object of the present invention is to devise and construct a picker provided with such adjustments.

In the operation of mechanical corn pickers the difficulty always encountered is the collection of broken stalks, weeds and other trash. A principal object of the present invention is to devise certain constructions for reducing clogging by such trash to a minimum. Other objects will be apparent from the detailed description to follow.

The objects of the invention have been attained by constructing the units of a corn picker so that they are laterally adjustable with respect to each other and, furthermore, so that the center divider between the two units is maintained at all times equally spaced from the outside dividers of the two units. Means have also been provided for clearing the trash and broken stalks, consisting of a positively driven rotating deflector on the center divider and rotating the deflectors on the dividers at the outside of the picking units. Positively driven means in the form of forwardly extending chains above the upper ends of the snapping rolls have also been provided to prevent the collection of trash at that location.

Another feature novel in the present construction is a deflector arranged at the outer side of the outer unit, positioned to deflect the stalks breaking off on that side of the unit over into the adjacent row whereby such stalks will be picked up in the next travel of the machine and the ears removed therefrom.

Other features of construction, such as the mounting of the rotating center deflector in a manner to permit its ready removal, have been incorporated in the machine to provide access in cleaning accumulation of trash from the machine and for inspecting its working parts.

In the drawings:

Figure 1 is a side elevation of a two-row picker with an elevator and sacking platform, which embodies the novel features of the present invention;

Figure 2 is an enlarged plan view showing the deflector at the side of the outside picking unit for deflecting the broken stalks into the adjacent row;

Figure 4 is a plan view, somewhat diagrammatic, showing the pivoting of the two picker units on the main frame. Said figure is broken away to show the linkage by which the center deflector is maintained equally spaced between the gatherers and dividers of the two units.

Figure 5 shows the pivotal connection between the inner picking unit frame and the main frame of the picker. This figure is partly in section, looking outwardly towards the grain-side of the machine.

Figure 6 is a detail in elevation, showing the same pivotal connection as Figure 5. This figure is taken from the inside of the inner picker unit frame, looking outwardly toward the grain-side of the machine.

Figure 7 is a detailed plan view of the pivoting bracket shown in Figures 5 and 6;

Figure 8 is a section taken on the line 8—8 of Figure 5;

Figure 9 is an enlarged detailed elevation of the connection between the outer picker unit and the main frame of the picker, looking inwardly from the grainward side of the machine;

Figure 10 is a bottom plan view, showing the pivotal connection of the outside picker unit frame on the main frame of the picker;

Figure 11 is an enlarged section of the universal connection between the outer picker frame and the main frame, taken on the line 11—11 of Figure 10;

Figure 12 is a section taken on the line 12—12 of Figure 11;

Figure 13 is a vertical longitudinal section taken through the picker unit portion of the machine, as shown in Figure 4, to show the center divider and the means by which it is connected to the picking units;

Figure 14 is a section taken on the line 14—14 of Figure 13, showing the linkage for maintaining the center divider in its central position;

Figure 15 is substantially the same as Figure 13, being broken away to a certain extent, showing the rotatable center deflector in lifted position for giving access to the interior portion of the machine;

Figure 16 is an enlarged section of the center stalk gatherer and divider, showing also the lower end of the rotatable center deflector;

Figure 17 is an enlarged detail of the latch which holds the lower end of the center deflector in position with respect to the center divider;

Figure 18 is a section taken on the line 18—18 of Figure 16;

Figure 19 is an enlarged detail of the keyhole plate in which the support for the lower end of the rotatable center deflector is mounted;

Figure 20 is an enlarged sectional detail of the upper end of the rotatable center deflector, showing the universal drive connection which permits said deflector to be lifted;

Figure 21 is an enlarged plan view, partly broken away in section, showing the center divider and the linkage which maintains it in center position during lateral movement of the two picker units;

Figure 22 is an enlarged plan view of the upper portion of the rotatable center deflector;

Figure 23 is an end elevation of the supporting member for the lower end of the rotatable center deflector; and Figure 24 is an elevation of the same element shown in Figure 23.

Figure 3:
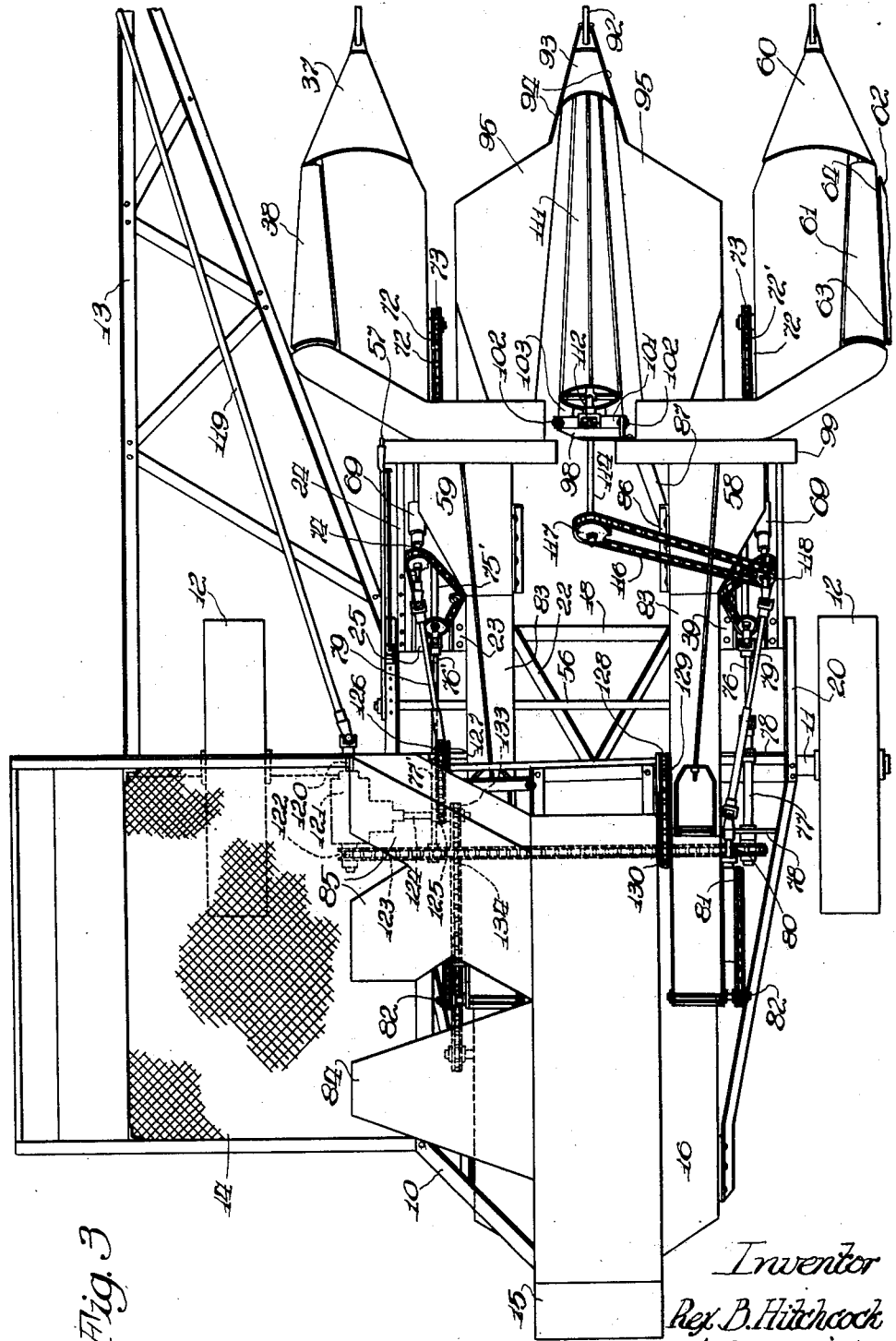
Figure 3 is a plan view of the same picker shown in Figure 1.

The drawings, as briefly described above, show the general construction, including the frame work, the power driven connections, two picking units and their pivotal and adjustable mountings, an elevator, and a bagging platform. The drawings also indicate the position of the husking rolls and other features of the machine which are not a part of the present invention. It is to be understood that certain elements of the machine have been shown diagrammatically and that others which are not necessary in the description and explanation of the features constituting the present invention, have not been shown.

The main frame of the picker, which will be designated by the numeral 10, is built up of angle bars with proper bracing, to provide a rigid substantial frame. Said frame is mounted upon a heavy transverse axle 11 and supported by widely spaced wheels 12 rotatably mounted on said axle. A draft frame 13, rigidly attached to the main frame, extends forwardly at one side thereof for pivotally attaching the picker to the drawbar of a tractor.

In the description of the machine, as is conventional in speaking of harvesting machines, the right side of the machine, looking forwardly in Figure 3, will be termed as the grainward side.

At the left side of the machine a bagging platform 14 is mounted for sacking grain which is delivered thereabove by an elevator 15. This picker is designed primarily for use in corn growing sections where the corn is bagged rather than hauled away from the picker, otherwise a tank might be employed instead of the bagging platform. A husking unit 16 is mounted at the rear of the main frame 10 of the picker. This husking unit will not be described and the details, other than the husking rolls 17 indicated in dotted lines in Figure 1, and the drive chains which will be hereinafter referred to, have not been shown.

Some distance forwardly of the axle 11 and vertically above the axle a transverse shaft 18 is rigidly mounted for pivotally connecting the picker units. Said shaft is mounted on angle bars 19, 20 and 21, which form a part of the rigid frame structure 10 of the machine. In addition to these angle bars, other bracing bars, such as the diagonally disposed bars 22, are utilized for forming a rigid secure support for the firm mounting of the picker units.

In Figure 4 only the transverse shaft 18 and the supports at the end thereof have been shown, the remainder of the machine being broken away in order to better illustrate the particular mounting of the picker units. The picker unit at the left of the machine will first be described. As shown in Figure 5, an angle bar 23 forms the outer member of this picker frame. A shaped plate 24, as shown in Figure 6, forms the inner member of the frame. These two members, together with interconnecting bars and plates, form the frame structure of the inner picker unit. Its exact construction and all the details thereof, are not shown as it is considered a single unit insofar as it relates to the present invention. A cross member 25 joins the frame members 23 and 24 at their upper end. Said member is securely braced to form a rigid part of the frame structure. A plate 26, securely riveted to the cross member, is provided with a hole 27. A short shaft 28 extends at an angle with respect to vertical, through the cross member 25 and the plate 26. Said shaft is rigidly secured to the cross member and extends rotatably through a securing bracket 29. Said bracket is provided with an extension 30 lying parallel to the plate 26. Openings 31 in said extension may be brought into registration with the opening 27 in said plate to provide for adjustment of the picker unit frame about the axis of the shaft 28. The shaft 28 extends through the bore formed in the member 27 and is rotatably and nonslidably secured with respect thereto by a collar 32 pinned to the shaft 28.

The connecting and securing bracket 29 is provided with a horizontal transverse portion 33 in which a bore 34 is formed. The shaft 18 extends through said bore, whereby the connecting member is rotatably supported on a transverse axis on the shaft. The portion 33 of the connecting member 29 is provided with a downwardly projecting extension 35, to which a lever arm 36 is rigidly connected.

As shown in Figure 4, the inner picker unit is provided with spaced forwardly extending portions, the inner one of which forms a support for a stalk gathering unit and divider 37 and the inner portion of which cooperates with the center divider, which will be hereinafter described. A rotatable stalk deflector 38 is mounted along the outer side of the inner portion of said picker unit. It is to be understood that the general construction of these picker units are conventional, as shown in practically all corn picker patents of the prior art. Some of the features of construction, including the positioning of the snapping rolls and the gathering chains, will be described in connection with the description of the outer unit.

Figures 9 to 12, inclusive, show the mounting of the frame structure of the outer picker unit. It is substantially the same as the mounting of the inner picker unit with the exception that the outer unit is pivotally mounted on two axes. The inner frame member 39 of the picker positioned at the grainward side of the machine and the outer frame member 40 are secured together by a cross member 41 in which a short shaft 42 is rigidly mounted. Said shaft is provided with a ball bearing 43 by which it is rotatably mounted on the connecting member 44. The shaft 42 extends through a bore in the member 44 and is secured against axial movement with respect thereto by a collar 45. The bearing 43 is designed to take radial and axial loads, whereby the picker unit may freely rotate about the axis of the shaft 42. A shield 46 secured to the cross member 41, is provided to protect the bearing 43 from grit and dirt. The member 44 is provided with a transverse portion 47, in which a bore is provided for rotatably mounting the member on the shaft 18.

A downwardly projecting extension 48 of the member 44 provides means for attaching a lever arm 49, as shown in Figure 1, by which the frame structure of the picker unit may be tilted about the transverse axis of the shaft 18. A compression spring 50, mounted around a rod 51, exerts pressure against a collar 52 on said rod. The rod slidably extends through a bracket 53 mounted on the main frame of the picker and is pivotally connected to the lever arm 49, whereby the pressure of the spring tends to lift the forward end of the picker unit. A link 54 pivotally connected also to the arm 49, is connected to an arm 55 on a rock shaft 56. A hand lever 57 connected to the rock shaft 56 provides means for lifting and lowering the picker unit, the operator being assisted by the action of the spring 50. It will be understood that exactly the same tilting mechanism may be employed on the inner picker unit, a similar linkage and compression spring being connected to the lever arm 36, shown in Figure 6. The same rock shaft may be used or an independent hand lever may be provided whereby the units are independently adjustable.

In order to proceed with the description of the dividers and deflectors as mounted on the two picker units, the frame structure of the right-hand unit, including the two members 39 and 40 above referred to, will be designated by the numeral 58. The left-hand unit will be designated by the numeral 59. The outer unit, which is mounted on the frame structure 58, is provided with a ground engaging stalk gatherer and divider 60 and a rotatable stalk deflector 61 along the grainward side. A deflecting shield 62 is also mounted on the frame structure of this unit. Said deflector may be, for example, connected by bars 63 and 64, or by any other suitable means. As shown in Figure 2, the deflector extends outwardly a sufficient distance to deliver the broken stalks which fall to the outside of the machine, over into or adjacent the next adjacent row, whereby the stalks will be gathered into the throat of the picker unit traversing said row during return travel of the machine. Figure 2 illustrates how the dividers 37 and 60 are pivoted on the picker units. Bars 65, to which the shields and the ground engaging member of the divider are secured, are pivotally mounted on the frame structure 58, whereby the dividers are floatingly mounted with respect to the ground. Picking rolls 66 are visible through the openings formed in the side frame member 40 in Figure 1. Upper and lower gathering chains 67 and 68 are also shown in this figure. Said chains are driven by a conventional sprocket mechanism, power being obtained from gearing contained in a housing 69 mounted on the frame structure of the picker unit. The gearing in said housing also provides, by means of a transverse shaft 70, means for driving a chain sprocket 71. A narrow frame 72 extending forwardly from the frame structure of the picker unit, supports at its outer end a chain sprocket 73. A toothed chain 72' is mounted on the sprockets 71 and 73. As shown in Figures 1 and 3, this chain extends forwardly substantially horizontally over the throat of the picker unit, substantially above the snapping rolls. The purpose of this chain is to keep the upper throat of the machine clear of stalks and trash. This is a novel feature of the machine and adds to its utility under adverse conditions of operation.

Power is supplied to gearing contained in the housing 69 by the upwardly extending shaft 74. Said shaft is driven by sprockets and a connecting chain from the shaft 75. The shaft 75 drives the snapping rolls, as will be understood by an inspection of Figure 1. Shafts 76 and 77, connected by universal joints to each other and to the shaft 75, provides means for transmitting power to the picker unit. The shaft 77 is mounted on bearing brackets 78 on the main frame of the picker. The application of power to this shaft will be described later.

Although only a part of the stalk gathering and ear snapping mechanism has been shown, it will be understood that this mechanism is conventional in construction and is very similar to the copending application, Serial No. 435,728, filed March 14, 1930. The mechanism of the inner unit has not been shown as it is exactly the same as the outer unit. The upwardly extending drive shaft 75' corresponds to the shaft 75, previously described. Said shaft is connected by a shaft 76' to a shaft 77' mounted on the frame structure, parallel to the shaft 77.

A shaft 79 is connected by a universal joint to the upper end of the shafts 74 of the two picker units. Said shaft 79, which is telescopic to provide for tilting of the picker unit, is connected by a universal joint to a shaft 80. Said shaft through suitable drive connections, operates a sprocket 81 which drives the conveyor for the picker unit and a sprocket 82 which operates trash rolls. This construction is not shown in detail as it forms no part of the present invention. The upwardly extending housing 83, which is secured on the main frame of the picker, houses the upper portion of the ear conveying elevator, the lower portion being carried on the frame structure of the picker. This construction is shown in the application previously referred to. The two housings which contain conveyors, deliver at the rear into the husking unit, previously referred to. The ears, after husking, are elevated by the conveyor 15 to the bagging chutes 84 and 85 mounted on the main frame of the picker above the bagging platform 14.

Referring to Figure 4, a bracket 86 is secured to the inner side of the outer picker unit. A pipe 87, bent inwardly to pass centrally between the two picker units, is pivotally secured to the brackets 86. A supporting member 88, secured to the lower end of the pipe 87, is provided with laterally spaced, forwardly extending ears 89. A pin 90 extends through aligned openings in said ears and through aligned openings in the side bars 91 which form the frame of the center stalk gatherer and divider 92. An upper shield 93, as shown in Figures 16 and 21, covers over the top of the divider. Side wings 94 are pivoted on vertical axes to the sides of the shield 93. Said wings overlap and slidably engage the gathering plates 95 which are mounted on the respective picker units.

A sleeve member 96 is slidably mounted on the pipe 87. Links 97 are pivoted on vertical axes above and below said member and to the adjacent portions of the picker units. As shown in Figure 4, when the units are in narrowly spaced position the links 97 extend at a substantial angle downwardly with respect to the pipe 87. This permits a sliding action upwardly of the sleeve member 96 when the units are spread apart, the links maintaining the center divider 92 equally spaced with respect to the dividers 37 and 60.

An inwardly extending supporting member 98, attached to the arch 99 of the outer picking unit, provides a support for the rotatable center deflector. As shown in Figures 20 and 22, the member 98 is provided with downwardly and forwardly projecting extensions 100, on which a semi-circular band 101 is pivoted on a transverse axis by the pins 102. Said band is connected to a trough-like sheet metal member 103 which extends downwardly and forwardly and is connected to a lower supporting member 104. Said member is provided with a sleeve-like portion 105 which extends through a keyhole slot 106 formed in a member 107. As above shown in Figure 16, the member 107 is secured to the shield 93 of the center divider. A latch 108, shown in Figure 17, is slidably mounted on the member 107 for sliding behind a lug 109 formed on the sleeve portion of the supporting member 107. A bore extending through the sleeve portion 105, forms a bearing for a short shaft 110.

The center deflector 111, which tapers somewhat in diameter from the upper to the lower end, is rotatably mounted at its lower end on the shaft 110. At its upper end said deflector is connected to one member 112 of a universal joint. The other member 113 of said universal joint is secured to a shaft 114 which is rotatably mounted in a bearing 115 carried by the supporting member 98. The universal joint, as will be understood by inspecting Figure 22, is in transverse alignment with the pivot axis of the member 107 whereby the lower end of the member and also the rotatable deflector may be lifted by said axis without interfering with the drive connections. The shaft 114 mounted in a bearing 15 carried by the bracket 98 extends upwardly, as shown in Figure 3, and is driven by a chain 116 engaging a sprocket 117 on said shaft and a sprocket 118 on the shaft 74.

Referring to Figures 13 and 15, the connection of the pipe 87 with the outer picker unit is shown in elevation. These figures show better the lower end construction of the bracket 88 to which the center divider unit is secured. Figure 16 also shows the connection of the center divider with the securing bracket 88. Attention is also called in this figure to the spring 93' which is secured to bars 94' pivotally connected to the wings 94 to hold said wings against the gathering plates 95 of the picker units. Figure 21 shows also the spring 93' and in dotted lines shows the wings in an extended position.

The operating mechanisms of the corn picker, as above described, are driven from a power takeoff shaft 119 to be connected to the power takeoff shaft of a tractor. Said shaft is connected by a universal joint to a shaft 120 which passes through a gearing housing 121. A chain sprocket 122 on said shaft rearwardly of the housing, drives a chain 123 which engages chain sprockets on the shafts 77 and 77'. As previously pointed out in connection with the description of the picking mechanisms, the shafts 77 and 77' drive the snapping mechanisms of the picker units, also the rotating center deflector and the trash clearing chains 72'.

A transverse shaft 124 extending from the housing 121 and driven by gearing therein, carries a chain sprocket 125 which drives the upwardly extending chain 126. Said chain drives a sprocket 127 mounted above the picker units on the portion of the frame structure of the picker which supports the elevator and bagging chutes. A smaller sprocket 128 carried on the same shaft with the sprocket 127, drives a chain 129 which engages and drives a sprocket 130. Said sprocket is mounted on a shaft 131 which carries the upper end of the elevator conveyor 132, indicated in dotted lines. It will be, therefore, understood that the elevator conveyor is driven from the upper end, this being preferable as the lower run of the conveyor, which carries the load, is maintained in tension by application of driving power at the upper end.

The shaft 124 also carries a sprocket 133 which drives a rearwardly and downwardly extending chain 134. Said chain drives the husking mechanism and the other mechanisms associated therewith. These mechanisms have not been shown because, as hereinbefore stated, they do not form any part of the present invention and may be of any conventional design.

The operation of the picker, as described, will be clear from the above description of the mechanisms. Each of the two units is pivoted on a transverse horizontal axis on the shaft 18. The units may be located on this shaft, spaced to accommodate the normal spacing of the rows to be operated upon. Due, however, to variation in width of rows, due to actual difference in spacing or due to inaccuracies in planting, it is desirable to provide a floating action of one of the picker units relative to the other. The left-hand unit is mounted for adjustment, as shown in Figures 5 to 8. This unit, of course, does not swing laterally during operation of the machine. The right-hand picker unit is mounted for swiveling or pivoting action, as shown in Figures 9 to 12, inclusive. This motion is restricted only by the limits defined by the construction of the machine, primarily by the length and angular position of the links 97. It is not only desirable to provide for relative lateral movement of the picking units but also to maintain the center divider between the rows being operated upon. For that reason the lower end of the center divider is mounted on the linkage, as best shown in Figure 4, which maintains the center divider equally spaced between the two outside dividers on the picking units. The wings 94 have also been provided to permit relative swinging movement while maintaining a comparatively smooth surface for engagement with the stalks contacted by the center divider and guided around said divider into the throats of the picking units. The detachable lower end mounting for the center deflector has been provided to permit easy access for cleaning the machine and inspecting the parts. By lifting the latch 108, as best shown in Figure 16, the center divider may be lowered, freeing the supporting member 104 from the keyhole slot 106, whereby the lower end of the rotatable deflector may be lifted, as shown in Figure 15. The universal joint for the drive connections and the hinge between the member 103 and the ears 100 on the supporting bracket 98 permit this upward swinging movement. By positively driving the center deflector, which is provided with a roughened surface, stalks which otherwise might hang over the center divider, are pushed over into the throat of the corn picker. The chain 116 is driven in the direction indicated by the arrow in Figure 3, whereby the trash and material tending to accumulate over the deflector 111 is thrown into the inside unit. This is particularly desirable as the deflector plate 62 delivers the broken stalks at the outer side of the machine into the adjacent row. This means that on the return travel of the machine there is not only the normal trash and broken stalks in the outside row, but also a certain amount of material deflected over into said row during the previous run of the machine. For that reason it is desirable to deflect the material at the center into the inner unit, whereby the outer unit is not loaded with an excess of material to handle.

While showing only certain of the more essential elements of a corn picker in which the invention has been embodied, applicant has carefully illustrated and described the pivoting connections between the picker units and the main frame of the picker, also the mounting of the center divider and rotatable deflector. It is in these features that the invention resides and applicant claims all modifications falling within the scope of the appended claims.

What is claimed is:

1. A corn picker comprising a wheel supported main frame, spaced picker units pivotally mounted on a transverse axis on said frame, means for pivoting one of said units on a substantially vertical axis for lateral swinging with respect to the other unit, a divider positioned between the two units, and means for connecting said divider and said units operable to maintain the divider centrally between the units during lateral relative movement thereof.

2. A corn picker comprising a wheel supported main frame, spaced picker units mounted on frame, means for pivoting one of said units on a substantially vertical axis for lateral swinging with respect to the other unit, a divider positioned between the two units, said divider being pivotally supported on a substantially vertical axis, and means for connecting said divider and said units operable to maintain the divider centrally between the two units during relative lateral movement thereof.

3. A corn picker comprising a wheel supported main frame, spaced picker units mounted on said frame for pivotal motion on transverse axes, one of said units being also mounted for swinging on a substantially vertical movement, a divider mounted between said units for swinging on a substantially vertical axis, and a linkage connecting said divider and said units operable to maintain the divider centrally between the two units during relative lateral movement thereof.

4. A corn picker comprising a wheel supported main frame, spaced picker units mounted on said frame, one of said units being mounted for swinging about a substantially vertical axis, each of said units being formed with spaced downwardly extending portions to form passageways for stalks, a center divider positioned to cooperate with the adjacent portions of said units to guide stalks into said throats, said divider being pivotally mounted on a substantially vertical axis, and means for connecting said divider to the adjacent portions of said units, said means being formed to maintain the divider centrally spaced between the two units.

5. A corn picker comprising a wheel supported main frame, spaced picker units mounted on said frame, one of said units being mounted for swinging about a substantially vertical axis, each of said units being formed with spaced downwardly extending portions to form passageways for stalks, a center divider positioned to cooperate with the adjacent portions of said units to guide stalks into said throats, said divider being pivotally mounted on a substantially vertical axis, and means for connecting said divider to the adjacent portions of said units, said means consisting of a longitudinally extending member on the divider, a collar slidable on said member, and links pivotally connected to said collar and to the picker units.

6. A corn picker comprising a wheel supported main frame, spaced picker units mounted on said frame, one of said units being mounted for swinging about a substantially vertical axis, each of said units being formed with spaced downwardly extending portions to form passageways for stalks, a center divider positioned to cooperate with the adjacent portions of said units to guide stalks into said throats, said divider being pivotally mounted on a substantially vertical axis, means for connecting said divider to the adjacent portions of said units, said means being formed to maintain the divider centrally spaced between the two units, a rotatable stalk deflector carried by the center divider, and means for rotating said deflector.

7. A corn picker comprising a wheel supported main frame, spaced picker units mounted on said frame, said units being provided with dividers for deflecting stalks into the units, and a deflecting shield mounted on the outside of one of the units, said shield being extended a distance sufficient to deliver material engaged thereby on the next adjacent row.

8. In a corn picker having a picker unit, including downwardly extending snapping rolls, and in combination therewith supporting means extending substantially horizontally over the top of the snapping rolls, means for supporting a trash forwarding and clearing chain on said support, and means for driving said chain.

9. A corn picker comprising a wheel supported main frame, spaced picker units pivotally mounted on a transverse axis on said frame, means for mounting one of said units for angular adjustment about a substantially vertical axis, means for pivoting one of said units on a substantially vertical axis for lateral swinging with respect to the other unit, a divider positioned between the two units, and means for connecting said divider and said units operable to maintain the divider centrally between the units during lateral relative movement thereof.

10. A corn picker comprising a wheel supported main frame, spaced picker units mounted on said frame, means for mounting one of said units for angular adjustment about a substantially vertical axis, means for pivoting one of said units on a substantially vertical axis for lateral swinging with respect to the other unit, a divider positioned between the two units, said divider being pivotally supported on a substantially vertical axis, and means for connecting said divider and said units operable to maintain the divider centrally between the two units during relative lateral movement thereof.

11. A corn picker comprising a wheel supported main frame, spaced picker units mounted on said frame, a center divider positioned between said units, a rotatable deflector mounted along the top of said divider, means for rotating said deflector, means for pivotally supporting said deflector at its upper end for swinging about a transverse axis, and means for detachably mounting the lower end of said deflector.

REX B. HITCHCOCK.